United States Patent [19]
Blackmon

[11] Patent Number: 5,258,937
[45] Date of Patent: Nov. 2, 1993

[54] ARBITRARY WAVEFORM GENERATOR

[75] Inventor: Fletcher A. Blackmon, Forestdale, Mass.

[73] Assignee: The United States of Amwerica as represented by the Secretary of the Navy, Washington, D.C.

[21] Appl. No.: 867,577

[22] Filed: Apr. 13, 1992

[51] Int. Cl.⁵ .......................... G06F 7/02; G06F 1/02; H03K 3/02
[52] U.S. Cl. ..................... 364/718; 377/39; 328/14; 328/61; 328/62
[58] Field of Search ................. 364/607, 718; 377/39; 328/14, 61, 62

[56] References Cited

U.S. PATENT DOCUMENTS

| | | | |
|---|---|---|---|
| 4,517,684 | 5/1985 | Fennel | 377/39 |
| 4,943,779 | 7/1990 | Pedersen et al. | 328/14 |
| 5,121,348 | 6/1992 | Dea et al. | 364/718 |
| 5,221,906 | 6/1993 | Hayashi et al. | 328/62 |

*Primary Examiner*—John S. Heyman
*Attorney, Agent, or Firm*—Michael J. McGowan; Prithvi C. Lall; Michael F. Oglo

[57] ABSTRACT

An arbitrary waveform generator is capable of producing pulse or continuous waveform signals. It utilizes an EPROM that sends out selected stored digital signals under control of a microprocessor and auxiliary equipment comprised of a clock and an address sequencer. A digital-to-analog converter receives the digital signals from the EPROM and converts them to analog signals.

4 Claims, 3 Drawing Sheets

ARBITRARY WAVEFORM GENERATOR

STATEMENT OF GOVERNMENT INTEREST

The invention described herein may be manufactured and used by or for the Government of the United States of America for governmental purposes without the payment of any royalties thereon or therefor.

BACKGROUND OF THE INVENTION (1) Field of the Invention

The present invention relates to an arbitrary waveform generator that can produce either pulse or continuous wave (CW) signals. The generator has the capability of producing arbitrary signals that can be output in any order. The waveform generation is arbitrary in the sense that the waveforms to be output can be created, programmed, and loaded into a memory device prior to generation and can not be changed during actual operation. The design was made to be compact and low power since the circuit will serve as the signal source section for a transmitter to be used in a deep water environment where the use of battery power is dictated.

(2) Description of the Prior Art

In the past, circuits, sometimes referred to as "pingers" were used to generate certain types of signals for acoustic transmission, communication, tracking, and channel modelling tests. These prior art circuits do not have the capability to produce arbitrary signals such as multi-frequency shift keyed signals (many tones sent in a single pulse at one time). Therefore, the arbitrary generation approach to waveform generation seems an integral part of the changing needs of the acoustic testing and modelling community.

SUMMARY OF THE INVENTION

Accordingly, it is a general purpose and object of the present invention to provide an arbitrary waveform generator. It is a further object that the generator has the ability to produce both pulse waveforms and continuous waveforms. Other objects are that the generator be compact and only require low power for lending itself to battery powered operation.

These objects are accomplished with the present invention by providing a system in which digital waveforms are created using a software package such as DADiSP. The software package forms signals that are then transferred to an EPROM. Each signal type occupies a certain block of address space within the EPROM. A great number of signals may be digitally stored in this way. The operator then constructs simple microprocessor computer codes to access any signal, any combination of signals, or all signals to form a unique waveform generation sequence. Therefore the operator selects arbitrarily which of the previously stored signals to generate. Key features include the EPROM storing a single pulse for pulse waveforms and a single period of a waveform for continuous waveforms. Other key features are the ability to control the sequence of generation, the number of times each signal is generated, the time between pulses, and the time between the generation of different signal types. These features are controlled by the microprocessor codes residing in a microprocessor.

DESCRIPTION OF THE PREFERRED EMBODIMENT

Figure 1:
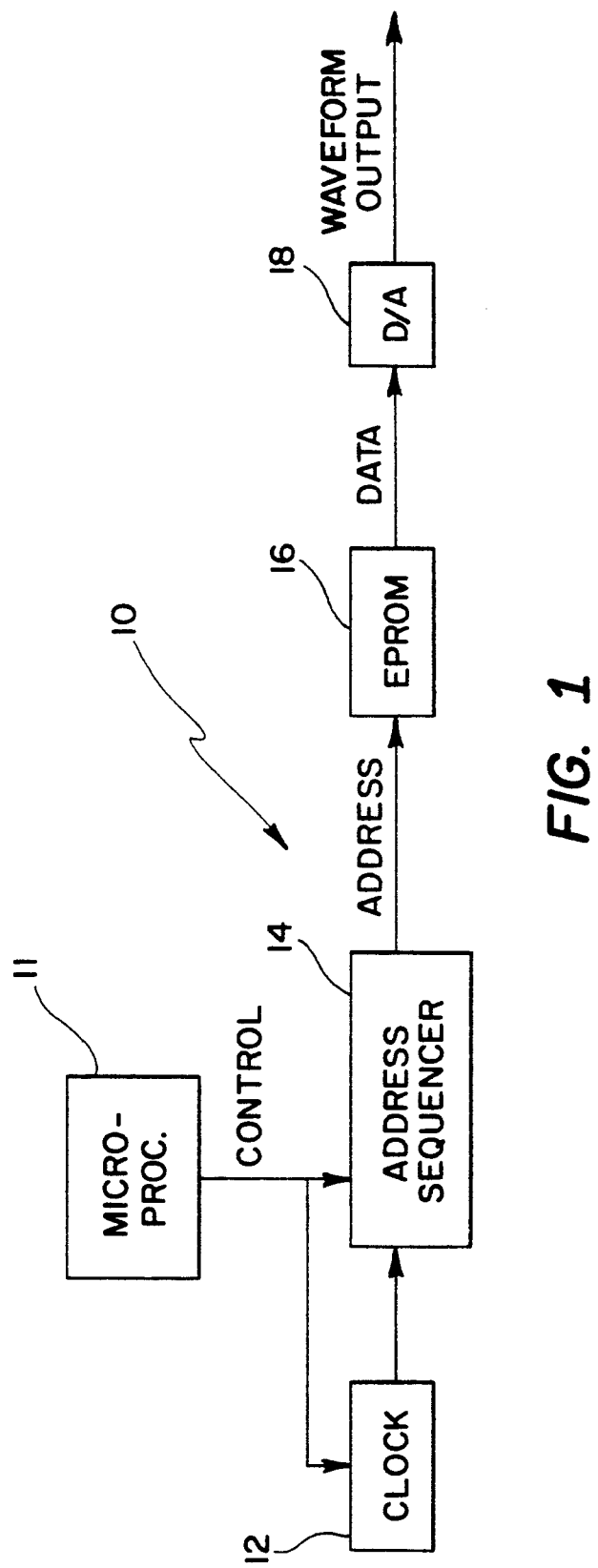
FIG. 1 is a block diagram of an arbitrary waveform generator in compliance with the present invention.

Referring now to FIG. 1 there is shown a simplified block diagram that depicts the circuit operation of an arbitrary waveform generator 10 in accordance with the present invention. The generator 10 comprises an Intel 8748H microprocessor 11, a clock 12, an address sequencer 14, a TI TMSC27512 64 kByte EPROM 16, and an AD 558 digital-to-analog converter 18.

Virtually any waveform within the circuit's specifications that can be expressed mathematically, may be constructed using the arbitrary waveform generator 10. The theory of operation for the circuit is as follows: (1) Create appropriately scaled (0-256 amplitude valued) waveform(s) using a digital signal processing software package such as DADiSP; (2) Create binary waveform datafile(s) using DADiSP's DSP Pipeline feature that converts the decimal data to binary data; (3) Use a PC compatible, software interactive EPROM programmer to place the contents of the binary waveform datafile(s) in certain bank(s) of address space within the EPROM 16; (4) Read out the stored predetermined waveform(s) from the EPROM 16 under microprocessor 11 control (Assembly language program) using the circuitry of the address sequencer 14 which uses the clock signal to increment the address. The output of the EPROM 16 (waveform data values) are then input to the digital-to-analog 18 converter which produces the analog waveform output.

Figure 2A:
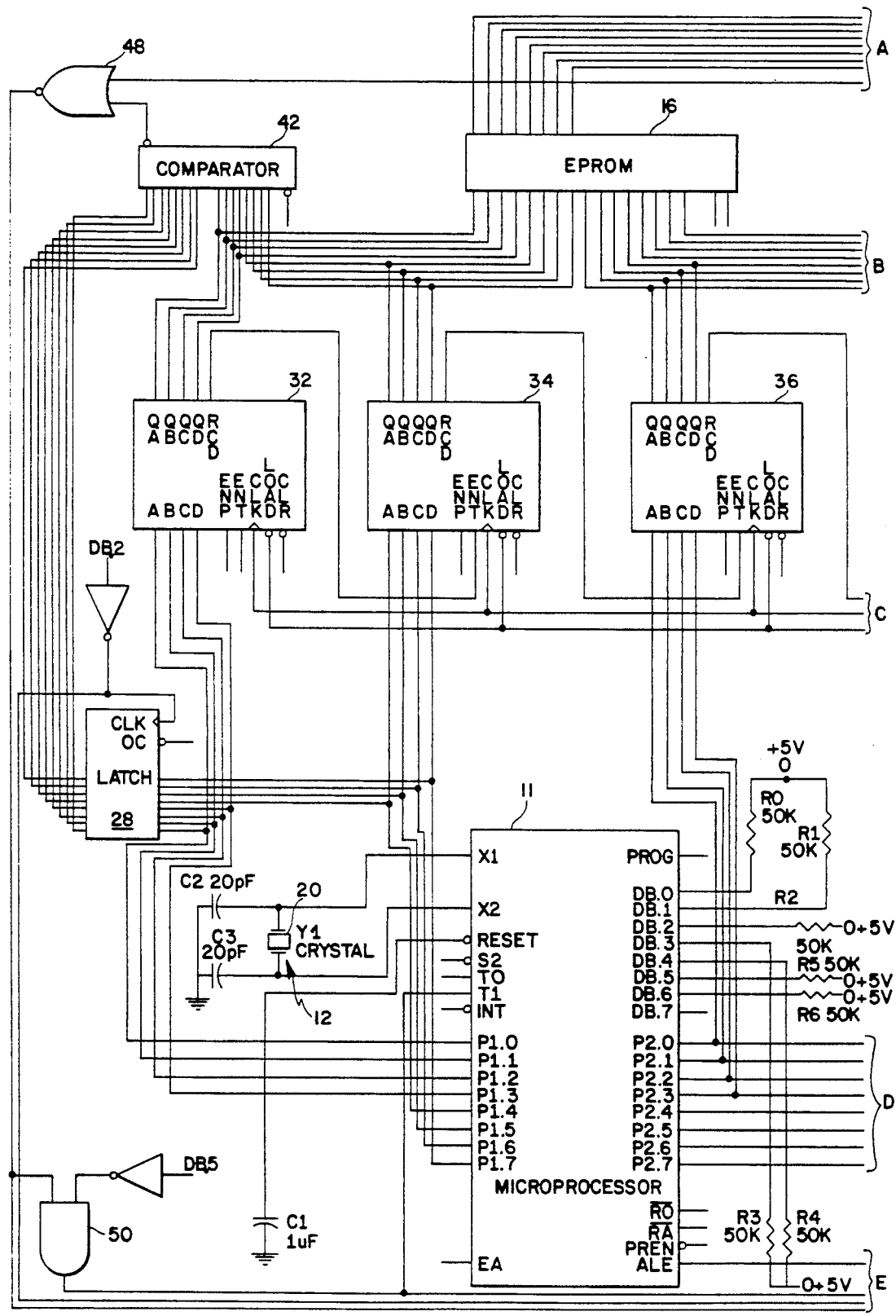
FIGS. 2A and 2B together form a schematic representation of the arbitrary waveform generator block diagram of FIG. 1.
Figure 2B:
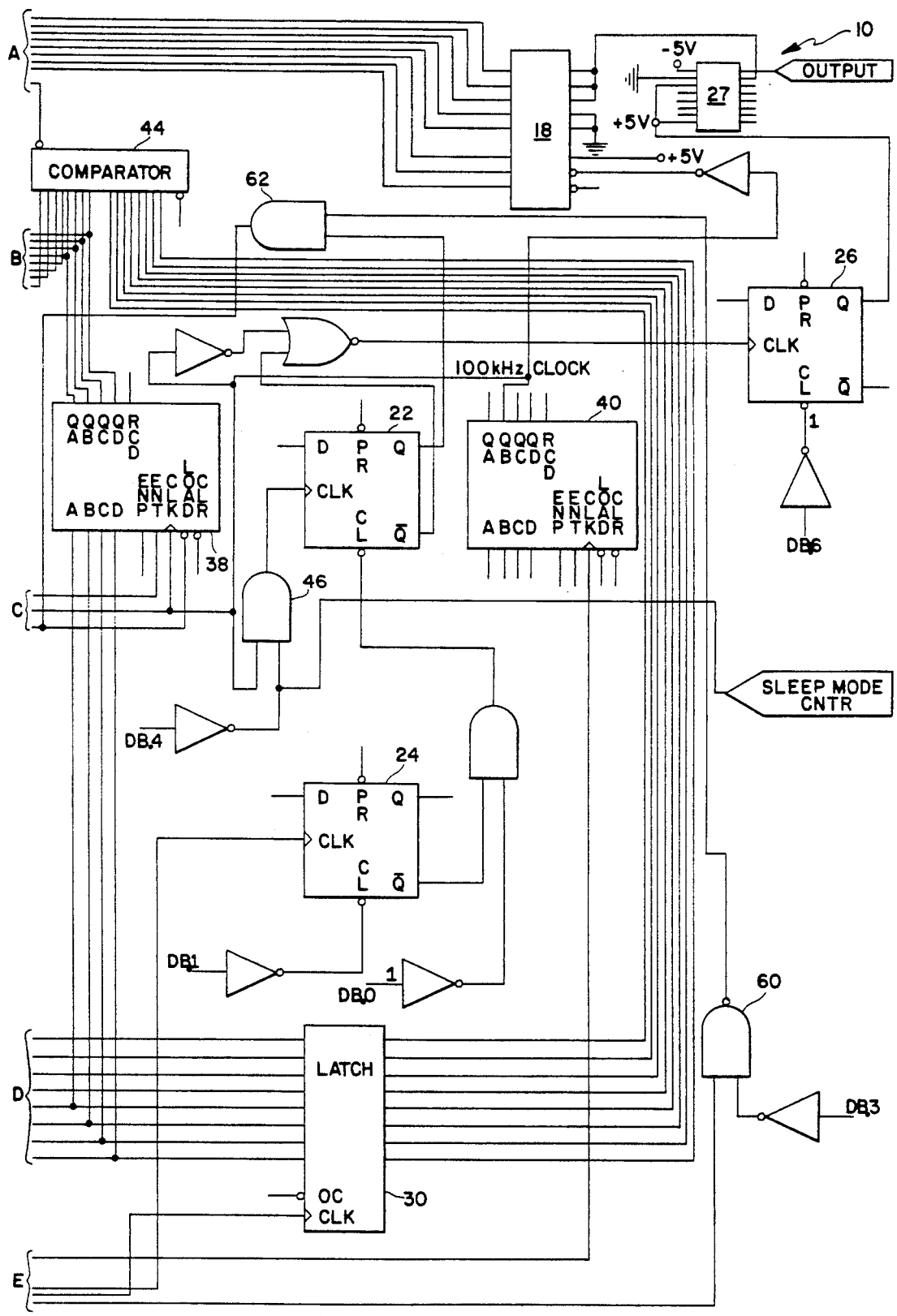

Refer now to FIG. 2 for a more detailed description of the waveform generator 10 and its theory of operation. In FIG. 2 components 10, 11, 12, 16, and 18 are the same components as in FIG. 1. The remaining components in FIG. 2, with the exception of analog switch 27 can be thought of as comprising the address sequencer 14 of FIG. 1. When power is applied to the waveform generator circuit 10 a program stored in the 8748H microprocessor 11 starts to execute. The time of execution for a 1 Byte instruction is 2.5 $\mu$s (400 kHz). In order to obtain this frequency a 6 MHz crystal 20 is divided by a factor of fifteen to produce the 400 kHz clock for execution of the microprocessor 11 code.

The pulse and continuous wave modes of operation with reference to the circuit schematic shown in FIG. 2 may be described in the following Way, given the microprocessor 11 port assignments below:

Port 1 (P1.0-P1.7)—Low Byte of 16 Bit Address
Port 2 (P2.0-P2.7)—High Byte of 16 Bit Address Each of the following Data Bus Port bits (DB.0-DB.6) from microprocessor 11 are inverted to yield the bit assignments given on the right hand side of the following assignment statements.

DB.0-Input to clear the counter load flip-flop 22
DB.1-Clear input to the end signal flip-flop 24
DB.2-Latch clock 28 input
DB.3-Mode of operation bit for operating NAND gate 60
DB.4-Start signal bit for operating AND gate 46
DB.5-End signal bit for operating AND gate 50
DB.6-Transmit terminate bit for operating flip-flop 26

DB.7-Not used

In operation, first, Data Bus Port Bits 0, 1, and 6 of the microprocessor 11 are toggled to clear all 74HC74 flip-flops 22, 24, and 26 and then to set the clear inputs high in preparation of being clocked. Clearing of the flip-flop 26 causes the output of the generator 10 to be disabled since the flip-flop 26 controls the output of the AD7510DI analog switch 27. Also occurring at "power on" are: (i) with the use of the Data Bus Port Bit 2, the clock inputs of the 74HC374 latches 28 and 30 are brought low, and (ii) the start signal bit, the end signal bit, and the mode bit that are respectively Data Bus Port Bits 4, 5, and 3 of the microprocessor 11 are set low. A 16 bit, 0 valued start address is output via ports 1 and 2 of the microprocessor 11 These ports are fed to the inputs of the four 74HC163 counters 32, 34, 36, and 38. The counters 32, 34, 36, and 38 are always enabled and their load inputs are controlled by flip-flops 22, and 24. Flip-flop 24 is waiting to be clocked; therefore the counters, 32, 34, 36, and 38 load inputs are enabled (low). Thus the counters 32, 34, 36, and 38 inputs will show up at the counters, 32, 34, 36, and 38 output on the next 100kHz clock pulse which is generated by dividing the ALE (400kHz) output of the microprocessor 11 by a factor of 4 using counter 40. Next, the 16 bit end address (location of the last waveform data value) of the waveform stored in the TMS27C512 EPROM 16 is output via ports 1 and 2 of the microprocessor 11. In addition to appearing at the inputs of the counters 32, 34, 36, and 38, this end address is fed to latches 28 and 30. The latches 28 and 30 clock input is toggled from low to high to low using the Data Bus Port Bit 2 of the microprocessor 11. This results in the storing of the end address low byte in the 74HC688 comparator 42 from latch 28 and the end address high byte in the 74HC688 comparator 44 from latch 30. By bringing the latch clock at each of the latches 28 and 30 low again, subsequent data at the inputs of latches 28 and 30 will not show up at the output of latches 28 and 30. The 16 bit start address (location of the first waveform data value) of the stored waveform is output via ports 1 and 2 of the microprocessor 11. This address appears at the output of the counters 32, 34, 36, and 38. The circuit is now awaiting the microprocessor 11 command to start either the pulse waveform or the CW waveform output process.

In the pulse waveform output process the start signal bit and the end signal bit are set high by using the Data Bus Port of the microprocessor 11. On the next rising edge of the 100 kHz clock pulse, flip-flop 22 is clocked by a 74HC08 AND gate 46, whose inputs are the start signal bit and the 100 kHz clock, causing the load input of counter 32, 34, 36, and 38 to be disabled (high). On the falling edge of this same clock pulse, flip-flop 26 is clocked causing the output of analog switch 27 to turn on. With the counter load input disabled the counters 32, 34, 36, and 38 will count up. The outputs of the counters 32, 34, 36, and 38 are connected to the address lines of EPROM 16 and also to the comparators 42 and 44. The data values stored at the addresses in the EPROM 16 pointed to by the counters 32, 34, 36, and 38 are output on 8 data lines which are connected to an AD558 digital-to-analog converter 18 whose analog output (enabled on the falling edge of the 100 kHz clock) is connected to the analog switch 27; thus yielding an analog waveform output.

The microprocessor 11 is waiting for its T1 input to become a "1", indicating that a single pulse has been output and that the end address has been detected. The pulse length is based on the product of the sample time and the number of addresses the waveform is stored in minus 1. When the outputs of the counters 32, 34, 36, and 38 reach the end address of the waveform, the outputs of both comparators 42, and 44 are zero. The outputs of comparators 42 and 44 are NORed together using a 74HC02 NOR gate 48. The output of the NOR gate 48 is applied to AND gate 50 with the END Signal Bit, setting T1 of microprocessor 11 high and clocking flip-flop 24 which in turn clears flip-flop 22, causing the load inputs of counters 32, 34, 36, and 38 to be enabled. On the next clock pulse, the counters 32, 34, 36, and 38 start loading the start address again. Detecting a high on the T1 input, the microprocessor 11 resumes forward program execution by jumping out of the wait state loop. The microprocessor 11 program is used to create any desired pulse separation time.

The pulse output process continues to repeat itself until the number of pulses value, stored in register R0 of the microprocessor 11, reaches 0. The number of pulses value reaches 0 in the following way. Each time a pulse is output, the number of pulses value stored in register R0 of the microprocessor 11 is decremented by 1. The end result of the pulse process is the generation of a finite periodic pulse train.

In the CW waveform output process the start signal bit that is Data Bus Port Bit 4 and the mode of operation bit that is Data Bus Port Bit 3 are set high. On the next rising edge of the 100 kHz clock pulse, flip-flop 22 is clocked by a 74HC08 AND gate 46, whose inputs are the Start Signal Bit and the 100 kHz clock, causing the load input of counter 32, 34, 36, and 38 to be disabled (high). On the falling edge of this same clock pulse, flip-flop 26 is clocked causing the output of analog switch 27 to turn on. With the counter load input disabled the counters 32, 34, 36, and 38 will count up. The outputs of the counters 32, 34, 36, and 38 are connected to the address lines of EPROM 16 and also to the comparators 42 and 44. The data values stored at the addresses in the EPROM 16 pointed to by the counters 32, 34, 36, and 38 are output on 8 data lines which are connected to an AD558 digital-to-analog converter 18 whose analog output (enabled on the falling edge of the 100 kHz clock) is connected to the analog switch 27; thus yielding an analog waveform output.

The end address is the address corresponding to one complete period or cycle of the waveform. When the output of the counter 32, 34, 36, and 38 reaches the end address of the cycle, the output of both comparators 42 and 44 is a zero. The comparators 42 and 44 outputs are NORed together using a NOR gate 48. The output of the NOR gate 48 is then NANDed together with the Mode bit from microprocessor 11 using a 74HC00 NAND gate 60. The output of the NAND gate 60 is ANDed at AND gate 62 with the Q output of the flip-flop 22 to produce a low on the counter 32, 34, 36, and 38 load input, causing the counter load input to be enabled. On the next clock pulse, the counters 32, 34, 36, and 38 load the start address again. The counters 32, 34, 36, and 38 count up again until the end address is reached. This sequence of events repeats until the End Signal Bit is set high (after a software programmed delay) and the mode bit is set low using the Data Bus Port of the microprocessor 11, indicating that the desired CW waveform has been achieved. The microprocessor 11 is waiting for its T1 input to become a "1", indicating that the CW waveform has been output and the final cycle of the end address has been detected. When the output of the counters 32, 34, 36, and 38 reaches the end address of the cycle for the last time, the output of both comparators 42 and 44 is a zero. The outputs of the comparators 42 and 44 are NORed together and the output of the NOR gate 48 is ANDed at AND gate 50 with the End Signal Bit. This sets T1 high and clocks flip-flop 24 which in turn clears flip-flop 22, causing the inputs of the counters 32, 34, 36, and 38 to be enabled (low). On the next clock pulse, the counters 32, 34, 36, and 38 start loading the start address again. Detecting a high on the T1 input, the microprocessor 11 resumes forward program execution by jumping out of the wait state loop. The microprocessor 11 then uses the Data Bus Port to set the start signal bit low and the end signal bit low. Flip-flop 24 is then cleared by the microprocessor 11. Next, the flip-flop clear inputs of 22 and 24 are set high. The end result of this entire process is the generation of a CW waveform.

There has therefore been described an improved waveform generator that is capable of producing arbitrary pulse and CW waveforms that have been stored within an EPROM that forms part of the generator. Other signal generators produce certain types of signals but are not able to produce new signal architectures without modification to the original hardware design. This new generator has circuitry that will accommodate new signal architectures by requiring the software creation of new binary files to be stored within the EPROM and also minimal changes in the microprocessor program code.

It will be understood that various changes in the details, materials, steps and arrangement of parts, which have been herein described and illustrated in order to explain the nature of the invention, may be made by those skilled in the art within the principle and scope of the invention as expressed in the appended claims.

What is claimed is:

1. An arbitrary waveform generator for producing pulse signals comprising:
   a clock providing pulses;
   a microprocessor connected to said clock for receiving said clock pulses;
   a plurality of counters connected to said microprocessor for receiving a start address from said microprocessor at said counters inputs and in response to a clock pulse providing said start address at the outputs of said counters, said counters further for receiving an end address from said microprocessor;
   a plurality of latches connected to said microprocessor for receiving and transmitting said end address, said plurality of said latches being inhibited from transmitting any other signal than said end address;
   a plurality of comparators connected to said latches for receiving said end address;
   a circuit connected to receive a start signal bit from said microprocessor and a clock pulse for disabling the load input of said counters, enabling said counters to then count up;
   an EPROM connected to said counters output, the data values stored in the EPROM pointed to by said counters output are output as digital signals from said EPROM;
   a digital to analog converter connected to said EPROM for receiving said output of digital signals from EPROM and for converting said digital signals to a pulse signal;
   an analog switch connected to the output of said digital to analog converter for outputting said pulse signal;
   said comparators are also connected to the outputs of said counters and compare the end signal received from the latches with the signals received from the counters, and operative such that when they are equal the comparators outputs are zero indicating the end address has been reached by the counters;
   a NOR gate connected to receive the outputs of the comparators;
   an AND gate connected to receive the output of said NOR gate and the end signal bit from said microprocessor;
   said microprocessor connected to said AND gate to receive a signal indicating a single pulse has been output and the end address has been detected;
   said microprocessor providing signals to said circuit for enabling the load inputs of the counters;
   said counters connected to start loading the start address again on the next clock pulse enabling the above sequence to continue; and
   a register within said microprocessor storing a first predetermined number is decremented each time a pulse is output, said register inhibits further operation upon reaching a second predetermined number.

2. An arbitrary waveform generator for producing continuous wave signals comprising:
   a clock providing pulses;
   a microprocessor connected to said clock for receiving said clock pulses;
   a plurality of counters connected to said microprocessor for receiving a start address from said microprocessor at said counters inputs and in response to a clock pulse providing said start address at the outputs of said counters, said counters further for receiving an end address from said microprocessor;
   a plurality of latches connected to said microprocessor for receiving and transmitting said end address, said plurality of said latches being inhibited from transmitting any other signal than said end address;
   a plurality of comparators connected to said latches for receiving said end address;
   a circuit connected to receive a start signal bit from said microprocessor and a clock pulse for disabling the load input of said counters, enabling said counters to then count up;
   an EPROM connected to said counters output, the data values stored in the EPROM pointed to by said counters output are output as digital signals from said EPROM;
   a digital to analog converter connected to said EPROM for receiving said output of digital signals from EPROM and for converting said digital signals to a continuous wave signal;
   an analog switch connected to the output of said digital to analog converter for outputting said analog signal;
   said comparators are also connected to the outputs of said counters and compare the end signal received from the latches with the signals received from the counters, and operative such that when they are equal the comparators outputs are zero indicating the end address has been reached by the counters;
   a NOR gate is connected to receive the outputs of the comparators;

a NAND gate is connected to receive the output of the NOR gate and the Mode bit;

an AND gate is connected to the output of the NAND gate and to an output of a flip-flop to produce a signal that enables the load inputs of the counters;

control means for providing said continuous wave signal for a predetermined period of time; and inhibiting means for inhibiting further operation after said predetermined period o time.

3. A method of providing a pulse waveform output in an arbitrary waveform generator comprising the steps of:

disabling the output of an analog switch;

outputting a start address from said microprocessor to inputs of a plurality of counters and having said start address appear at said plurality of counters output on a next clock pulse;

outputting an end address from said microprocessor to said counters inputs and to all comparators through respective latches and inhibiting further transmission of signals to said comparators through said latches;

outputting said start address from said microprocessor to inputs of said counters and transmitting said start address from said inputs to said outputs of said counters;

generating from said microprocessor a start signal bit high and a end signal bit high;

turning on said analog switch;

counting up with said counters and having their counted up addresses transmitted to an EPROM and to said comparators;

outputting the data values stored at the EPROM addresses pointed to by said counted up addresses to a digital to analog converter;

converting said data values from digital to analog form thereby forming a pulse output and outputting said pulse output through said analog switch;

generating an end of pulse signal indicating the end address was received by said comparators and said end signal bit was generated and receiving this signal at an input to said microprocessor;

reducing a number of pulses remaining, that is stored in the microprocessor, by one;

enabling the load input of said counters;

delaying the further operation of the system a predetermined period of time to create a pulse separation; and generating additional pulse outputs in the above manner until said number of pulses remaining that is stored in the microprocessor reaches zero.

4. A method of providing a continuous waveform output in an arbitrary waveform generator comprising the steps of:

disabling the output of an analog switch;

outputting a start address from said microprocessor to inputs of a plurality of counters and having said start address appear at said plurality of counters output on a next clock pulse;

outputting an end address from said microprocessor to said counters inputs and to all comparators through respective latches and inhibiting further transmission of signals to said comparators through said latches;

outputting said start address from said microprocessor to inputs of said counters and transmitting said start address from said inputs to said outputs of said counters;

generating from said microprocessor a start signal bit high and a mode signal bit high;

turning on said analog switch;

counting up with said counters and having their counted up addresses transmitted to an EPROM and to said comparators;

outputting the data values stored at the EPROM addresses pointed to by said counted up addresses to a digital to analog converter;

converting said data values from digital to analog form thereby forming a continuous wave output and outputting said continuous wave output through said analog switch;

generating an end of wave signal indicating the end address was received by said comparators and said mode signal bit was generated and utilizing this signal to enable said counter load input;

generating additional continuous wave outputs for a predetermined period of time;

generating at said microprocessor an end signal bit high and a mode signal bit low, thereby indicating the desired CW waveform length has been achieved;

counting up with said counters and having their counted up addresses transmitted to an EPROM and to said comparators;

generating an ending signal indicating the end address was received by said comparators and said end signal bit was generated and receiving this signal at an input to said microprocessor; and inhibiting the further generation of continuous wave outputs.

* * * * *